Figure 1:
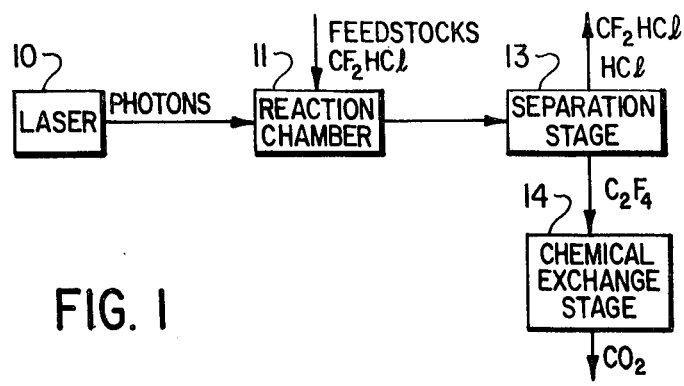

United States Patent [19]

Gauthier et al.

[11] 4,436,709

[45] Mar. 13, 1984

[54] LASER PRODUCTION OF CARBON-13 BASED ON CF₂HCL

[75] Inventors: Michel Gauthier, Aylmer; Peter A. Hackett; Clive Willis, both of Ottawa, all of Canada

[73] Assignee: Canadian Patents & Development Limited, Ottawa, Canada

[21] Appl. No.: 350,741

[22] Filed: Feb. 22, 1982

[30] Foreign Application Priority Data

May 26, 1981 [CA] Canada ................................ 378279

[51] Int. Cl.³ .......................................... B01D 59/00
[52] U.S. Cl. .............................. 423/437; 204/158 R; 250/423 P
[58] Field of Search .................... 204/157.1 R, 158 R; 423/437; 250/423 P

[56] References Cited

U.S. PATENT DOCUMENTS 4,120,767  10/1978  Bittenson et al. ............... 204/158 R

OTHER PUBLICATIONS

Gauthier et al., "Efficient Production of $^{13}C_2F_2$ ..." *Appl. Phys. B* 28, 43–50 (1982).
Lyman et al., "Enrichment of Boron, Carbon and Silicon Isotopes ..." *J. Appl. Phys.* 47 (2) 595–601 (1976).
Andrews et al., "Infrared Spectra ...", *J. Phys. Chem.* 83 (7) 824–831 (1979).
Grunwald et al., "Megawatt I. R. Laser Chemistry of $CHClF_2$" *J. Amer. Chem. Soc.* 99 (20) 6515–6521 (1977).
Stachewski, "Aktuelle Produktionsverfahren zur Gewinnung" *Chemie-Technik* 4 (8) 269–280 (1975).

*Primary Examiner*—Deborah L. Kyle
*Attorney, Agent, or Firm*—James R. Hughes; Alan A. Thomson

[57] ABSTRACT

A method of producing carbon-13 using $CF_2HCl$ as the feedstock (substrate) material in which the $CF_2HCl$ is enriched up to a first level of C-13 by I.R. laser photodissociation and then to 90–99% C-13 by a second exchange process. In the preferred arrangement the second stage is a chemical exchange process.

3 Claims, 2 Drawing Figures

LASER PRODUCTION OF CARBON-13 BASED ON $CF_2HCL$

This invention relates to a method for isotope enrichment by laser radiation and more particularly to a method of producing carbon-13 by multiphoton decomposition of $CF_2HCl$.

The use of carbon-13 as an industrial compound is not widespread at the present time but is expected to increase. Extensive application of carbon-13 to medical screening programs is anticipated. The present method of production is by low temperature distillation of carbon monoxide and this process is expensive, provides small throughput, needs large inventory of starting materials, and must be symbiotic with a liquid air plant.

A method of isotopic separation by photopredissociation is described in U.S. Pat. No. 3,983,020, issued Sept. 28, 1976 to C. B. Moore and E. S. Young. A photochemical method for carbon isotopic enrichment is disclosed in U.S. Pat. No. 4,120,767 issued Oct. 8, 1978 to S. N. Bittenson and P. Houston. This patent describes a process using, as a starting material, a gaseous mixture of at least two isotopic $CF_3I$ species and irradiating this mixture in a reaction zone with laser radiation at a pressure below about 10 Torr to cause relative enrichment of one of the species. The enriched residual substrate is $^{13}CF_3I$. This process is effective but yields are low and therefore production costs are high.

In co-pending United States application No. 25,886 filed Apr. 2, 1979 in the name of Peter A. Hackett, Clive Willis and Michel Gauthier, now abandoned, a method of producing of carbon-13 by multiphoton dissociation of $CF_3Br$ or $CF_3Cl$ is disclosed. In a paper in The Journal of Chemical Physics July 1, 1979, Vol. 71, No. 1, by Peter A. Hackett, Clive Willis and Michel Gauthier, a method of producing carbon-13 by multiphoton dissociation of $CF_3COCF_3$ is described.

In co-pending United States application No. 132,656, filed Mar. 21, 1980, in the name of Peter A. Hackett, Wing S. Nip and Clive Willis, now U.S. Pat. No. 4,328,078, a method of producing carbon-13 by multiphoton dissociation of perfluoropropene ($C_3F_6$) is described.

It is another object of the present invention to provide an inexpensive method of carbon-13 production.

This and other objects of the invention are achieved by a method of producing carbon-13 using $CF_2HCl$ as the feedstock (substrate) material in which the $CF_2HCl$ is enriched up to a first level of C-13 by I.R. laser photodissociation and then to 90-99% C-13 by a second exchange. In the preferred arrangement the second stage is a chemical exchange process.

Figure 2:
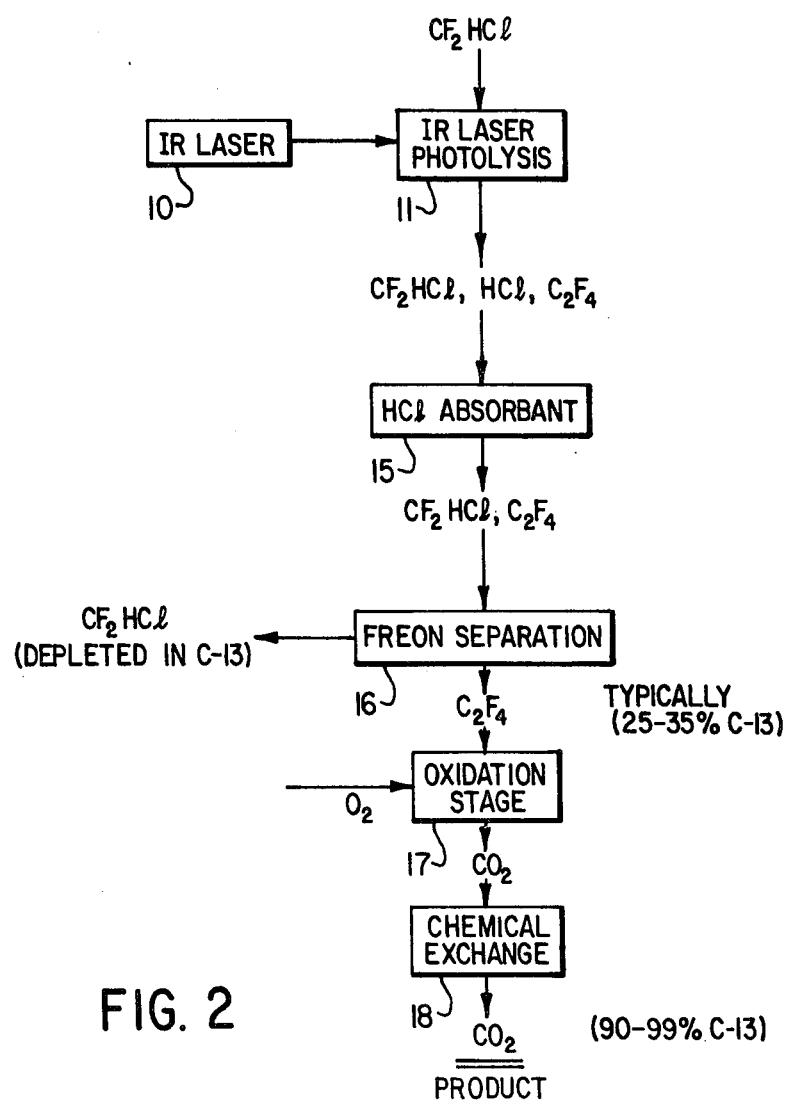

In drawings which illustrate an embodiment of the invention,

FIG. 1 is a block diagram of the two stage process involving chemical exchange, and FIG. 2 is a more detailed flow-diagram of the process.

Referring to FIG. 1, an IR laser 10 irradiates a feedstock of $CF_2HCl$ in reaction chamber 11 to give HCl and $CF_2$ enriched in C-13. The products from this stage ($CF_2HCl$, HCl, $C_2F_4$) are passed to separation stage 13 where the HCl and the $CF_2HCl$ (depleted in C-13) are removed. The remaining component, $C_2F_4$ is passed to chemical exchange stage 14 from which a $CO_2$ product enriched in C-13 is obtained.

Referring to FIG. 2, the feedstock of gaseous $CF_2HCl$ is irradiated in an appropriate cell 11 by the IR laser 10. The $CF_2HCl$ is a cheap commercial substrate and has none of the problems associated with previously suggested substrate such as $CF_3I$, $CF_3Br$, etc. The substrate pressure is in the range 10-100 Torr, depending upon laser pulse length. The IR laser operates in the frequency range 1040-1080 cm $-1$ (wavenumbers) with a fluence greater than 5 J cm$^{-2}$. The photolysis selectively decomposes the $CF_2HCl$ and is operated for a sufficient time to give $C_2F_4$ enriched in C-13 to approximately 25-35% along with $CF_2HCl$ and HCl. These products are passed to absorber stage 15 where the HCl is removed and then to freon separation stage 16 where the $CF_2HCl$ which is depleted in C-13 is removed. The $C_2F_4$ remaining is passed to oxidation stage 17 where it is oxidized to provide a $CO_2$ product that is passed to chemical exchange stage 18. This is a $CO_2$-carbamate exchange reaction that separated the $^{13}CO_2$ and the $^{12}CO_2$ to give a $CO_2$ product 90-99% C-13.

We claim:

1. A method of producing carbon-13 by multiphoton decomposition of $CF_2HCl$, said material containing carbon-12 and carbon-13 isotopic species, comprising:
    (a) irradiating gaseous $CF_2HCl$ in a reaction chamber at a pressure in the range 10-100 Torr with an infra-red laser beam at a frequency in the range 1040-1080 wavenumbers to selectively decompose the $CF_2HCl$ to give $C_2F_4$ enriched to a first level of carbon-13, $CF_2HCl$, and HCl,
    (b) passing these products through an absorber to remove the HCl and a separation stage to remove the $CF_2HCl$ depleted in carbon-13,
    (c) oxidizing the $C_2F_4$ to form $CO_2$, and
    (d) passing the $CO_2$ through a second exchange stage to separate the $^{13}CO_2$ and the $^{12}CO_2$ and give a $CO_2$ product containing approximately 90-99% carbon-13.

2. A method of producing carbon-13 as in claim 1 wherein the $CO_2$ is passed through a chemical exchange stage to separate the $^{13}CO_2$ and the $^{12}CO_2$ and give a $CO_2$ product.

3. A method of producing carbon-13 as in claim 1 or claim 2 wherein the $CF_2HCl$ is decomposed to give $C_2F_4$ enriched to approximately 25-35% carbon-13.

* * * * *